R. OLLEO.
BEATER STICK SUPPORT.
APPLICATION FILED SEPT. 4, 1918.
1,307,874.
Patented June 24, 1919.
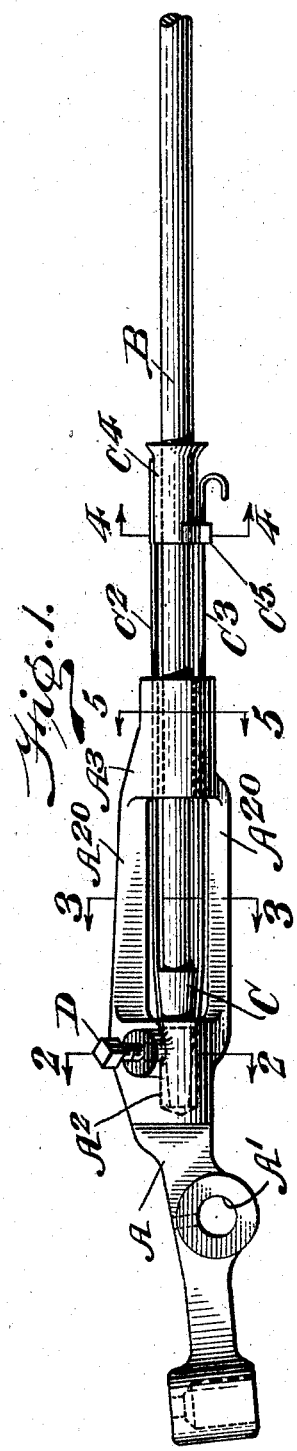
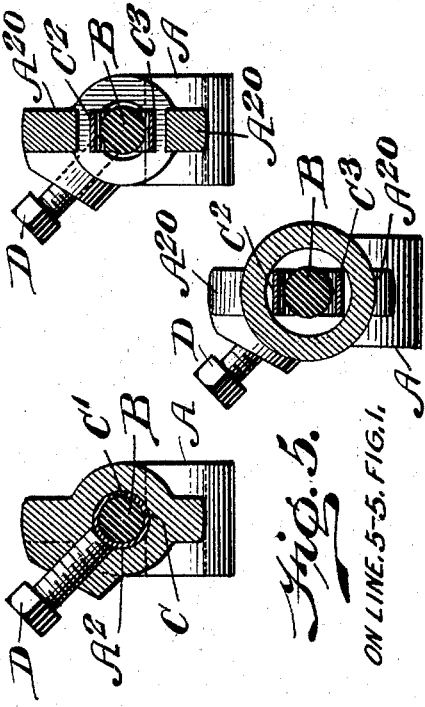
Inventor
Ralph Olleo
By Chambers & Hubbell
his Attorneys

UNITED STATES PATENT OFFICE.

RALPH OLLEO, OF NEW YORK, N. Y., ASSIGNOR TO FREDERICK OSANN COMPANY, OF NEW YORK, N. Y., A CORPORATION OF NEW YORK.

BEATER-STICK SUPPORT.

1,307,874.  Specification of Letters Patent.  Patented June 24, 1919.

Application filed September 4, 1918. Serial No. 252,512.

*To all whom it may concern:*

Be it known that I, RALPH OLLEO, a subject of the King of Italy, residing at New York, in the county of New York, State of New York, have invented certain new and useful Improvements in Beater-Stick Supports, of which the following is a true and exact description, reference being had to the accompanying drawings, which form a part thereof.

My present invention consists in improved means for holding beater sticks such as are employed in fur beating machines or the like to whip dust out of furs and fabrics, and to renovate their appearance. In such beating machines the beater stick proper is in the form of a flexible rod, usually of wood, which is secured in a holder which is oscillated to lift the beater stick away from the work and to bring it down into contact with the latter with a whiplike stroke. With such apparatus the tendency of the beater stick to break from the effects of the repeated flexure at the point of its connection to the beater holder has been a source of considerable trouble and expense.

The object of the present invention is to provide a flexible beater stick support by means of which the beater stick is supported in the beater holder proper so as to materially reduce the breaking tendency of the beater sticks.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described the preferred embodiment of my invention.

Of the drawings:

Figure 1 is an elevation of a beater stick and the beater holder in which it is mounted.

Figs. 2, 3, 4 and 5 are transverse sections taken, respectively, on the lines 2—2, 3—3, 4—4 and 5—5 of Fig. 1.

The beater stick holder A, shown in the drawings is of the type, used for example in the beating machine shown in my prior Patent No. 1,229,778, granted June 12, 1917. In the operation of such a machine the beater stick holder A is rapidly oscillated about an axis coincident with that of the opening A' through the beater stick holder. The beater stick holder, as shown, is formed with a socket $A^2$ approximately radial with the axis of oscillation and at some distance in advance thereof is provided with a collar $A^3$. As shown the collar $A^3$ is connected to the portion of the holder in which the socket $A^2$ is formed by arms $A^{20}$. The collar $A^3$ forms a bearing through which the flexible beater stick B, formed of wood or the like, passes loosely. The stock B is secured in the socket $A^2$ as by means of the clamping screw D.

The beater stick is yieldingly supported by means of a beater stick support comprising in the form shown a tubular socket portion C which snugly surrounds the inner end of the beater stick and is received in the socket $A^2$ and is directly engaged by the clamping screw D. Advantageously the tubular part C is slit at one side as indicated at C', so that when the clamping screw D is tightened up both the tubular portion C and the portion of the beater stick B which it surrounds are rigidly secured to the beater holder. Secured to the tubular part C are resilient flexible elements which extend parallel to the beater stick along side of the latter and projecting through the beater holder collar $A^3$. Preferably, as shown, there are two of these flexible portions. One portion $C^2$ runs along the side of the beater stick remote from the work, while the other portion $C^3$ runs along the side of the beater stick adjacent the work. At its outer end the flexible portion $C^2$ is secured to a tubular portion $C^4$ surrounding the beater stick B, said tubular portion being provided with a yoke or guide $C^5$, between which and the body of the tubular portion $C^4$, the flexible part $C^3$ loosely passes. Advantageously, as shown, the flexible parts $C^2$ and $C^3$ are formed of tempered steel strips which are brazed or otherwise secured to the socket C', which is formed of sheet metal. The strip $C^2$ is brazed or otherwise secured to the collar $C^4$ which preferably is formed of sheet metal as is the yoke portion $C^5$ which may be brazed or otherwise secured to the body of the tubular portion $C^4$. The parts are so proportioned that the beater stick may move slightly within the socket $A^3$ in the direction of the plane of oscillation, though any appreciable movement of this character is opposed by the resilient beater support arms C² and C³.

In operation, as the beater stick B is rapidly oscillated, the resilient arms C² and C³ form a yielding support for the portion of the beater stick adjacent the beater holder which I have found in practice greatly reduces the beater stick breakage. This reduction in breakage I attribute largely to the fact that the resilient elements C² and C³ distribute the force applied to the section of the beater stick adjacent the collar A³ along a portion of the length of the stick appreciably greater than the length of the collar A³, in part the force thus distributed tapering off gradually as the ends of the resilient members C² and C³ are reached. The collar C⁴, to which the flexible arm C² is rigidly connected, while the other flexible arm is loosely connected thereto, keeps the outer ends of the flexible arms C² and C³ close to the beater stick thus insuring their effective supporting action at all times, and avoiding unnecessary independent vibration of these arms, while at the same time the outer ends of the arms are permitted the movement relative to one another in the direction of their length which is necessary to secure the desired flexibility.

While in accordance with the provisions of the statutes I have illustrated and described the best form of my invention now known to me, it will be apparent to those skilled in the art that changes may be made in the form of the apparatus disclosed without departing from the spirit of my invention and that certain features of my invention may sometimes be used with advantage without the corresponding use of other features.

Having now described my invention, what I claim as new and desire to secure by Letters Patent, is:

1. A beater holder formed with a socket for a beater stick and with a bearing in advance of said socket, a beater stick passing loosely through said bearing and having its end secured in said socket, and a beater stick support comprising resilient flexible portions extending parallel to the beater stick through said bearing along side the beater stick and fixed to said holder.

2. In combination a beater holder provided with a socket for a beater stick and with a bearing in advance of said socket, a beater stick passing loosely through said bearing and having its end secured in said socket and a beater support comprising resilient flexible elements lying alongside the beater stick at opposite sides of the latter, which pass through said bearing and are fixed with respect to the beater holder adjacent said socket and means restricting the movement of said flexible parts toward and away from the beater stick at a point in advance of said bearing.

3. A beater holder formed with a socket for a beater stick and with a bearing in advance of said socket, a beater stick passing loosely through said bearing and having its end secured in said socket, and a beater stick support comprising a tubular portion surrounding the beater stick and extending into said socket, and a second tubular portion surrounding the beater stick in advance of said bearing, and resilient portions extending parallel to the beater stick through said bearing and each connected at one end to the first mentioned tubular portion and one rigidly connected at its other end to the second of said tubular portions, while the other end of said other resilient portion is slidingly connected to said tubular portion.

4. A beater stick support comprising tubular portions adapted to surround the beater stick and a resilient portion connecting said tubular portions at one side of the beater stick, and a second resilient portion lying at the other side of the beater stick and rigidly connected at one end to one of said tubular portions, and slidingly connected at its other end to the other of said tubular portions.

5. A beater stick support comprising a tubular portion adapted to snugly receive the socket end of a beater stick, a pair of resilient strips rigidly connected each at one end to opposite sides of said tubular portion, a second tubular part adapted to surround the beater stick to which the other end of one of said strips is rigidly secured, said second tubular part being provided with a yoke loosely surrounding the other end of the other of said strips.

RALPH OLLEO.

Copies of this patent may be obtained for five cents each, by addressing the "Commissioner of Patents, Washington, D. C."